US008880826B2

(12) United States Patent
Cherian et al.

(10) Patent No.: US 8,880,826 B2
(45) Date of Patent: Nov. 4, 2014

(54) SYSTEM AND METHOD FOR WRITE ONCE READ MANY (WORM) STORAGE IN AN INFORMATION HANDLING SYSTEM

(75) Inventors: Jacob Cherian, Austin, TX (US); Farzad Khosrowpour, Pflugerville, TX (US); Marco A. Peereboom, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 1174 days.

(21) Appl. No.: 12/582,268

(22) Filed: Oct. 20, 2009

(65) Prior Publication Data

US 2011/0093677 A1 Apr. 21, 2011

(51) Int. Cl.
*G06F 12/14* (2006.01)
*G06F 3/06* (2006.01)
*G06F 17/30* (2006.01)
*G06F 21/60* (2013.01)

(52) U.S. Cl.
CPC ............ *G06F 3/0659* (2013.01); *G06F 3/0673* (2013.01); *G06F 17/30188* (2013.01); *G06F 12/1416* (2013.01); *G06F 21/60* (2013.01); *G06F 3/0623* (2013.01)
USPC .......................................... 711/163; 711/156

(58) Field of Classification Search
CPC ... G06F 3/092–3/0623; G06F 12/14–12/1491; G06F 17/30188; G06F 21/00–21/88; G06F 2206/1014
See application file for complete search history.

(56) References Cited

U.S. PATENT DOCUMENTS

| 5,265,230 | A  | * | 11/1993 | Saldanha et al. .............. 711/161 |
| 5,581,737 | A  | * | 12/1996 | Dahlen et al. ................. 711/170 |
| 7,194,538 | B1 |   | 3/2007  | Rabe et al. |
| 7,328,260 | B1 |   | 2/2008  | Muthiyan et al. |
| 7,401,338 | B1 |   | 7/2008  | Bowen et al. |
| 7,403,987 | B1 |   | 7/2008  | Marinelli et al. |
| 7,506,040 | B1 |   | 3/2009  | Rabe et al. |
| 2005/0097260 | A1 | * | 5/2005 | McGovern et al. ........... 711/100 |
| 2005/0238175 | A1 | * | 10/2005 | Plotkin et al. ................. 380/281 |
| 2007/0079146 | A1 | * | 4/2007 | Hsu et al. ...................... 713/194 |

* cited by examiner

*Primary Examiner* — April Y Blair
*Assistant Examiner* — Nicholas Simonetti
(74) *Attorney, Agent, or Firm* — Larson Newman, LLP

(57) ABSTRACT

A Write-Once Read-Many (WORM) memory controller receives data from a processing system that is addressed to a location in a storage device, stores the data and a tag at the location, receives second data from the processing system that is addressed to the location, determines that the location includes the tag, and prevents the second data from being stored at the location based upon the presence of the tag. A WORM memory device sends a reply to a controller in response to an initialization command. The reply includes an address number that corresponds with the storage capacity of the WORM memory device. The WORM memory device sends another reply to another controller in response to another initialization command. The initialization commands are different from each other. The other initialization reply includes an address number of zero.

20 Claims, 5 Drawing Sheets

300

| Byte/Bit | 7 | 6 | 5 | 4 | 3 | 2 | 1 | 0 |
|---|---|---|---|---|---|---|---|---|
| 0 | colspan=8 | OPERATION CODE |||||||
| 1 | colspan=8 | CONTROL |||||||
| 2 | colspan=8 rowspan=2 | Reserved |||||||
| 6 ||||||||| 
| 7 | colspan=8 | ADDITIONAL CDB LENGTH (18h) |||||||
| 8 | (MSB) | colspan=7 rowspan=2 | 302  SERVICE ACTION (TBD) ||||||| 
| 9 | | | | | | | | (LSB) |
| 10 | Reserved | VRPROTECT || DPO | Reserved | EBP | BYTCHK | Reserved |
| 11 | colspan=8 | Reserved |||||||
| 12 | (MSB) | colspan=7 | LOGICAL BLOCK ADDRESS |||||||
| 19 | | | | | | | | (LSB) |
| 20 | (MSB) | colspan=7 | INITIAL DATA BLOCK REFERENCE TAG |||||||
| 23 | | | | | | | | (LSB) |
| 24 | (MSB) | colspan=7 | DATA BLOCK APPLICATION TAG |||||||
| 25 | | | | | | | | (LSB) |
| 26 | (MSB) | colspan=7 | DATA BLOCK APPLICATION TAG MASK |||||||
| 27 | | | | | | | | (LSB) |
| 28 | (MSB) | colspan=7 | TRANSFER LENGTH |||||||
| 31 | | | | | | | | (LSB) |

| Byte/Bit | 7 | 6 | 5 | 4 | 3 | 2 | 1 | 0 |
|---|---|---|---|---|---|---|---|---|
| 0 | colspan=8 | OPERATION CODE |||||||
| 1 | colspan=8 | CONTROL |||||||
| 2 | colspan=8 rowspan=2 | Reserved |||||||
| 6 |||||||||
| 7 | colspan=8 | ADDITIONAL CDB LENGTH (18h) |||||||
| 8 | (MSB) | colspan=7 rowspan=2 | SERVICE ACTION (TBD) |||||||
| 9 | | | | | | | | (LSB) |
| 10 | Reserved | WRPROTECT || DPO | FUA | Reserved |||
| 11 | colspan=8 | Reserved |||||||
| 12 | (MSB) | colspan=7 | LOGICAL BLOCK ADDRESS |||||||
| 19 | | | | | | | | (LSB) |
| 20 | (MSB) | colspan=7 | INITIAL DATA BLOCK REFERENCE TAG |||||||
| 23 | | | | | | | | (LSB) |
| 24 | (MSB) | colspan=7 | DATA BLOCK APPLICATION TAG |||||||
| 25 | | | | | | | | (LSB) |
| 26 | (MSB) | colspan=7 | DATA BLOCK APPLICATION TAG MASK |||||||
| 27 | | | | | | | | (LSB) |
| 28 | (MSB) | colspan=7 | TRANSFER LENGTH |||||||
| 31 | | | | | | | | (LSB) |

SYSTEM AND METHOD FOR WRITE ONCE READ MANY (WORM) STORAGE IN AN INFORMATION HANDLING SYSTEM

FIELD OF THE DISCLOSURE

This disclosure relates generally to information handling systems, and relates more particularly to Write-Once Read-Many (WORM) data storage in an information handling system.

BACKGROUND

As the value and use of info information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system may include a WORM data storage system to permanently retain data. Permanent data retention may be desirable for versioning, secure logging, or to meet regulatory requirements.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which:

FIG. 3 is an illustration of a 32-byte VERIFY command;

FIG. 4 is an illustration of a 32-byte WRITE command;

The use of the same reference symbols in different drawings indicates similar or identical items.

DETAILED DESCRIPTION OF DRAWINGS

Figure 1:
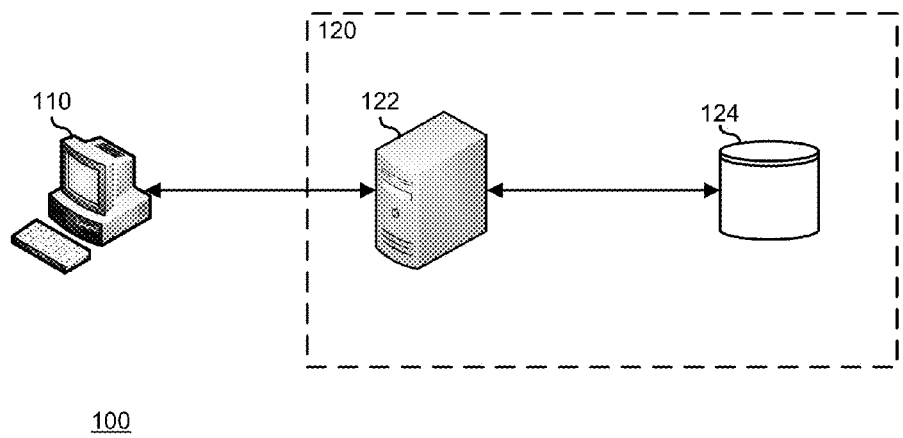
FIG. 1 is a functional block diagram of an embodiment of an information handling system with a Write-Once Read-Many (WORM) storage system.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random-access memory), nonvolatile such as read-only memory or flash memory) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

An information handling system can include a host processing system and a data storage system. In a particular embodiment, described herein, the host processing system writes data to, and reads data from the data storage system. The data storage system provides Write-Once Read. Many (WORM) data storage functionality for the information handling system. A non-limiting example of a data storage system includes disk memory, non-volatile random access memory such as FLASH or other non-volatile storage, another data storage system, or a combination thereof.

FIG. 1 illustrates an information handling system 100 according to an embodiment of the present disclosure, including one or more host processing systems 110 and one or more WORM storage systems 120. WORM storage system 120 includes one or more disk controllers 122 and a disk drive 124, and can include other disk drives (not illustrated). Host processing system 110 is connected to disk controller 122, and disk controller 122 is connected to disk drive 124. Host processing system 110 is adapted to transfer data to and from disk controller 122 over an interface such as a Small Computer System Interface (SCSI), a Peripheral Component Interconnect (PCI) Express interface, or another data communication interface. Disk drive 124 may be formatted into storage sectors of a fixed size, and data is read from and written to disk drive 124 by disk controller 122 on a per sector basis. In a particular embodiment, disk drive 124 may be formatted before being connected to disk controller 122. In another embodiment, disk drive 124 may be initially unformatted, and is formatted by disk controller 122 after being connected thereto.

In operation, disk controller 122 determines if a particular sector has been written to, and if so, disk controller 122 prevents subsequent write operations to that particular sector. Where disk drive 124 is pre-formatted, each sector is initialized with a tag that indicates whether or not the sector has been written to. Where disk drive 124 is formatted by disk controller 122, disk controller 122 initializes each sector with the tag to indicate whether or not the sector has been written to. Subsequently, when host processing system 110 needs to write data to WORM storage system 120, disk controller 122 checks the tag in the target sector to determine if the sector has been written to. If not, then disk controller 122 writes the data to the sector. If the sector has been written to, then disk controller 122 prevents the data write to the sector and indicates to host processing system 110 that the data write has failed due to a protection error.

Figure 2:
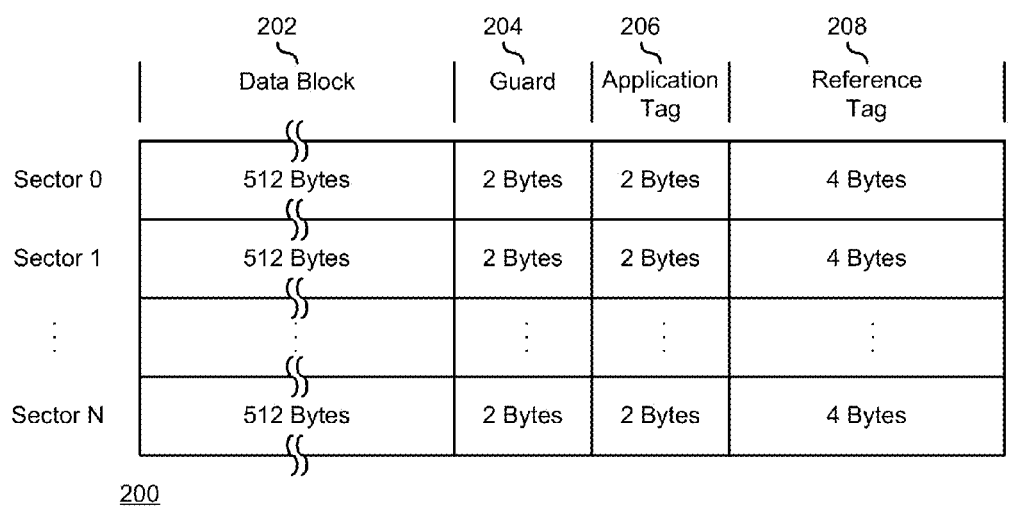
FIG. 2 is an illustration of sectors in a block storage device that supports the Small Computer System Interface (SCSI) T10 Protection Information Model.

In a non-limiting example, WORM storage system 120 includes disk controller 122, and disk drive 124 is a SCSI device that operates in accordance with the SCSI Architecture Model—5, Revision 01, published Jan. 27, 2009. FIG. 2 illustrates the blocks/sectors for a SCSI disk drive similar to disk drive 124. In a particular embodiment, disk drive 124 is formatted into "N" sectors or logical blocks of 520 bytes, where N is substantially equal to the disk drive capacity in bytes divided by 520 bytes. Each sector includes a 512-byte data block 202, and an 8-byte protection information field (PIF) that includes a guard field 204, an application tag 206, and a reference tag 208, as defined in the T10 SCSI protection information model. Guard tag 204 and reference tag 208 are defined by the SCSI specification, and are not user definable. Application tag 206 is user definable, and includes information related to enabling the WORM feature, as described below. In another embodiment, disk drive 124 is formatted into "N" sectors of more than 520 bytes, or of less than 520 bytes. In initializing a the WORM feature in WORM storage system 120, disk controller 122 selects disk drive 124 as the WORM storage drive. Other drives in disk array 130 can be selected for re-writable data storage as needed or desired.

In a non-limiting embodiment, disk controller 122 enables disk drive 124 with Type 2 SCSI protection, wherein 32-byte SCSI commands are processed by disk drive 124. Disk controller 122 then initializes application tags 206 for all sectors to a known value, for example binary "10100101 10100101" (hex "A5 A5"). When host processing system 110 needs to write data to a particular sector on disk drive 124, disk controller 122 first issues a 32-byte verify command 300 (VERIFY), illustrated in FIG. 3, to disk drive 124. VERIFY 300 includes an application tag field 304 (bytes 24 and 25) that is set to the example known value of hex "A5 A5" and a verify protection field 302 (VRPROTECT) (bits 5 and 6 of byte 10) that is set to enable checking of the application tag field. Disk drive 124 compares the data in application tag field 304 of the received VERIFY 300 with application tag 206 of the targeted sector, and if the verify protection field 302 is set to enable checking, responds with data indicating whether or not the fields match.

If the fields match, then the targeted sector has not been written to since being initialized and disk controller 122 issues a 32-byte data write command 400 (WRITE), illustrated in FIG. 4, of the data to the selected sector of disk drive 124. WRITE 400 includes an application tag field 402 (bytes 24 and 25) that is set to a different value than the initialization value, for example binary "01011010 01011010" (hex "5A 5A"), that gets written to application tag 206 of the target sector. If the fields do not match, as determined by VERIFY 300, then the targeted sector was written to subsequent to being initialized and disk controller 122 will not issue a WRITE 400 to disk drive 124, but will instead issue a protection error back to host processing system 110. In this way, any second or subsequent attempt by host processing system 110 to write to a particular target sector will result in a protection error being sent to host processing system 110.

VERIFY 300 also includes an application tag field mask 306 such that, in another embodiment, only selected bits of application tag field 304 are compared with application tag 206 of the targeted sector. In another embodiment, a different data integrity scheme and protection type is formatted into the data sectors on disk drive 124, and disk controller 122 supports a different verification scheme to ensure that a sector, once written to, is not over-written. In yet another embodiment, disk drive 124 does not include sectors formatted with PIF bytes. In this case, disk controller 122 performs a verify function on the sector to check if a predetermined initialization pattern is present in the sector. If the predetermined initialization pattern is not present, then disk controller 122 prevents subsequent data writes to the sector.

In the embodiments described above, disk drive 124 can be removed from information handling system 100 and placed into another information handling system (not illustrated). In this case, if the disk controller associated with the other information handling system does not support WORM functionality in accordance with the present disclosure, then the data stored on disk drive 124 can be overwritten, thereby defeating the intention to maintain the data on disk drive 124. Thus, in another embodiment, disk controller 122 and disk drive 124 support drive based encryption, and disk controller 122 sets the access keys for disk drive 124 such that attempts to access, erase, or over-write the data on disk drive 124 by another controller will fail, thereby maintaining the WORM functionality.

Figure 5:
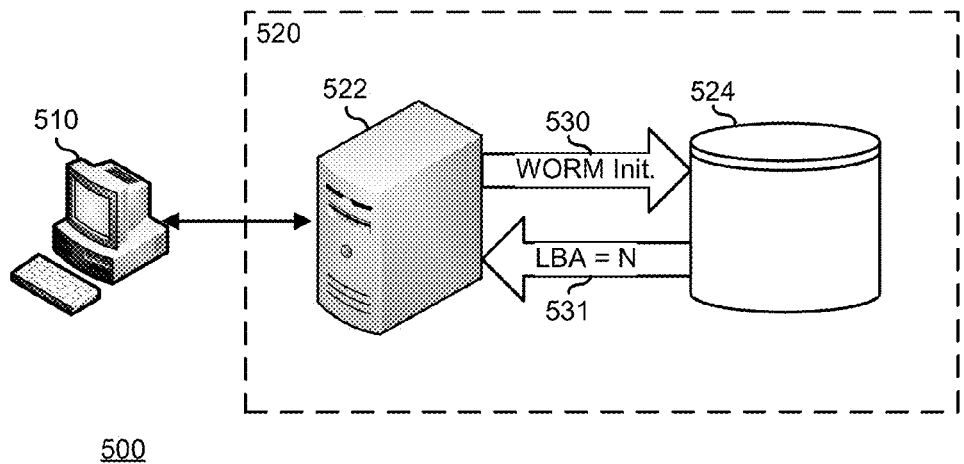
FIG. 5 is a functional block diagram of another embodiment of an information handling system with a WORM storage system.

FIG. 5 illustrates an information handling system 500 that is similar to information handling system 100, in accordance with another embodiment of the present disclosure. Information handling system includes a host processing system 510 and a WORM storage system 520. WORM storage system 520 includes a WORM disk controller 522 and a WORM disk drive 524, and can include other disk drives (not illustrated). Host processing system 510 is connected to WORM disk controller 522, and WORM disk controller 522 is connected to WORM disk drive 524. WORM disk drive 524 is formatted into storage sectors of a fixed size, and data is read from and written to WORM disk drive 524 by WORM disk controller 522 on a per sector basis, and can be pre-formatted, or can be formatted by WORM disk controller 522. In operation, WORM disk controller 522 and WORM disk drive 524 are adapted such that the WORM functionality of WORM disk drive 524 is maintained and other disk controllers (not illustrated) are not able to access the data contained on WORM disk drive 524, unless the other disk controllers include the WORM features of WORM disk controller 522, as described hereinafter.

In particular, WORM disk controller 522 is adapted to send a WORM initialization command 530 to WORM disk drive 524. Where WORM disk controller 522 and WORM disk drive 524 are SCSI devices, WORM initialization command 530 can be a six-, ten-, 12-, 16-, or 32-byte command with an operation code (OPCODE) in the range of C0h to FFh, indicating that WORM initialization command 530 is a vendor specific command. WORM disk drive 524 is adapted to receive WORM initialization command 530, and in response, to send a WORM initialization reply 531 to WORM disk controller 522. WORM initialization reply 531 includes information about the size of the data storage capacity of WORM disk drive 524, in the form of a Logical Block Address (LBA) number that is substantially equal to the number of sectors on WORM disk drive 524, labeled "N".

Figure 6:
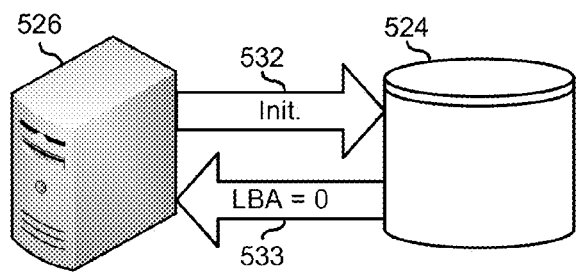
FIG. 6 is a functional block diagram of a storage system similar to the WORM storage system of FIG. 5.

FIG. 6 illustrates a data storage system 600 that includes a disk controller 526 connected to WORM disk drive 524. Disk controller 526 does not include the WORM functionality associated with WORM disk controller 522. In particular, disk controller 526 is not adapted to send WORM initialization command 530, but rather sends an initialization command 532 in accordance with a normal SCSI initialization sequence. WORM disk drive 524 is adapted to receive initialization command 532, and in response, to send an initialization reply 533 to disk controller 526. Initialization reply 533 includes an LBA number of zero blocks. In this way, the capacity of WORM disk drive 524 will appear to be zero sectors, effectively excluding disk controller 526 from accessing or changing the data stored on WORM disk drive 524.

Figure 7:
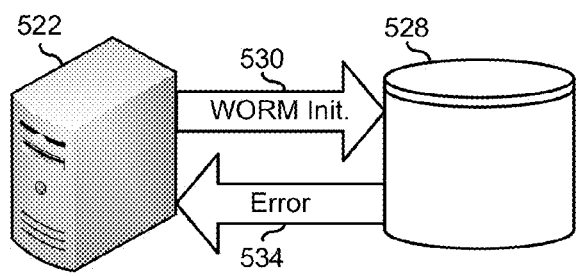
FIG. 7 is a functional block diagram of another storage system similar to the WORM storage system of FIG. 5.

FIG. 7 illustrates a data storage system 700 that includes WORM disk controller 522 connected to disk drive 528. Disk drive 528 does not include the WORM functionality associated with WORM disk drive 528. In particular, disk drive 528 is not adapted to receive WORM initialization command 530, and will respond to WORM initialization command 530 with an error reply 534. In this way, WORM disk controller 522 will recognize that disk drive 528 does not include WORM functionality and WORM disk controller 522 will not initiate WORM data storage on disk drive 528.

In a particular embodiment, after WORM disk controller 522 sends WORM initialization command 530, and WORM disk drive 524 sends WORM initialization reply 531, WORM storage system 520 functions similarly to WORM storage system 120 to maintain WORM functionality as described above with respect to FIGS. 1-4. For example, WORM disk drive 524 can be formatted such that each sector includes an 8-byte PIF and the application tag field can be initialized with a known value. Thereafter, WORM disk controller 522 can precede write operations with a verify command to determine if data has already been written to a particular sector, and thereby prevent over-writing of data on WORM disk drive 524. In another embodiment, WORM disk controller 522 and WORM disk drive 524 support drive based encryption, and WORM disk controller 522 sets the lock key and the erase key, such that attempts to access, erase, or over-write the data on WORM disk drive 524 by another WORM disk controller will fail, thereby maintaining the WORM functionality, and improving data security.

Figure 8:
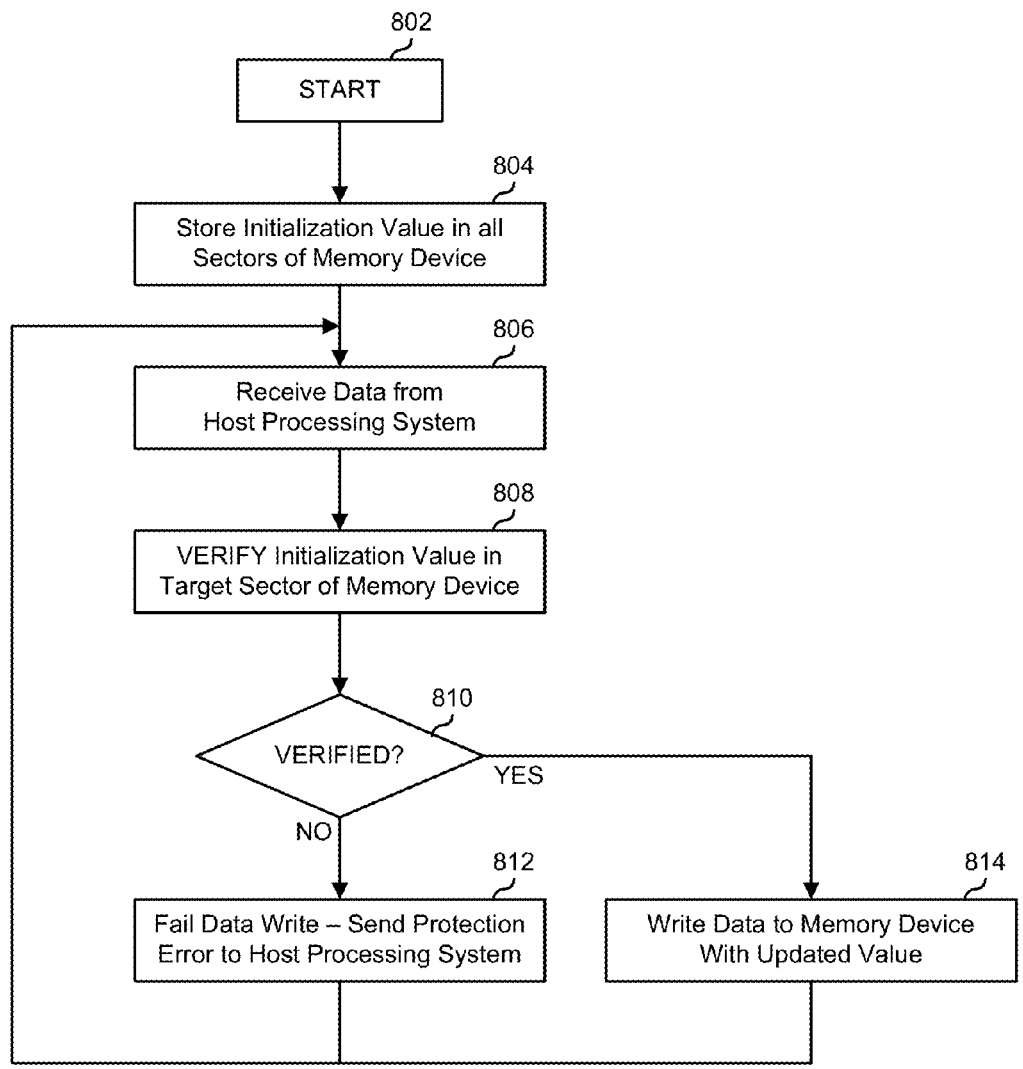
FIG. 8 is a flowchart illustrating a method for a WORM storage system.

FIG. 8 illustrates a method of implementing a WORM storage system in a flowchart form, in accordance with an embodiment of the present disclosure. The method starts at block 802. A WORM controller stores a known initialization value in each sector of a memory device in block 802. For example, disc controller 122 can store the value A5 A5 hex in application tag 206 of each sector on disk drive 124. Data is received by the WORM controller from a host processing system in block 806. Thus, host processing system 110 can send data to disk controller 122 to be written to disk drive 124. The WORM controller verifies the initialization value in the target sector of the memory device in block 808. As such, disk controller 122 can issue VERIFY 300 to disk drive 124 with the initialization value in application tag field 304. A decision is made as to whether or not the initialization value is verified in decision block 810. For example, disk drive 124 can compare the value in application tag field 304 with the value of application tag 206 in the target sector to determine if they are the same value. If not, the "NO" branch of decision block 810 is taken and the WORM controller prevents the data from being written to the memory device and sends a protection error to the host processing system in block 812, and then processing returns to block 806, where data is received by the WORM controller from a host processing system. For example, disk controller 122 can prevent the data from being written to disk drive 124 and can send an error back to host processing system 110. If the initialization value is verified, the "YES" branch of decision block 810 is taken, and the data is written to the memory device along with an updated value in block 814, and then processing returns to block 806, where data is received by the WORM controller from a host processing system. Thus, disk controller 124 can issue a WRITE 400 of the data to disk drive 124, including an updated value in application tag field 402.

Figure 9:
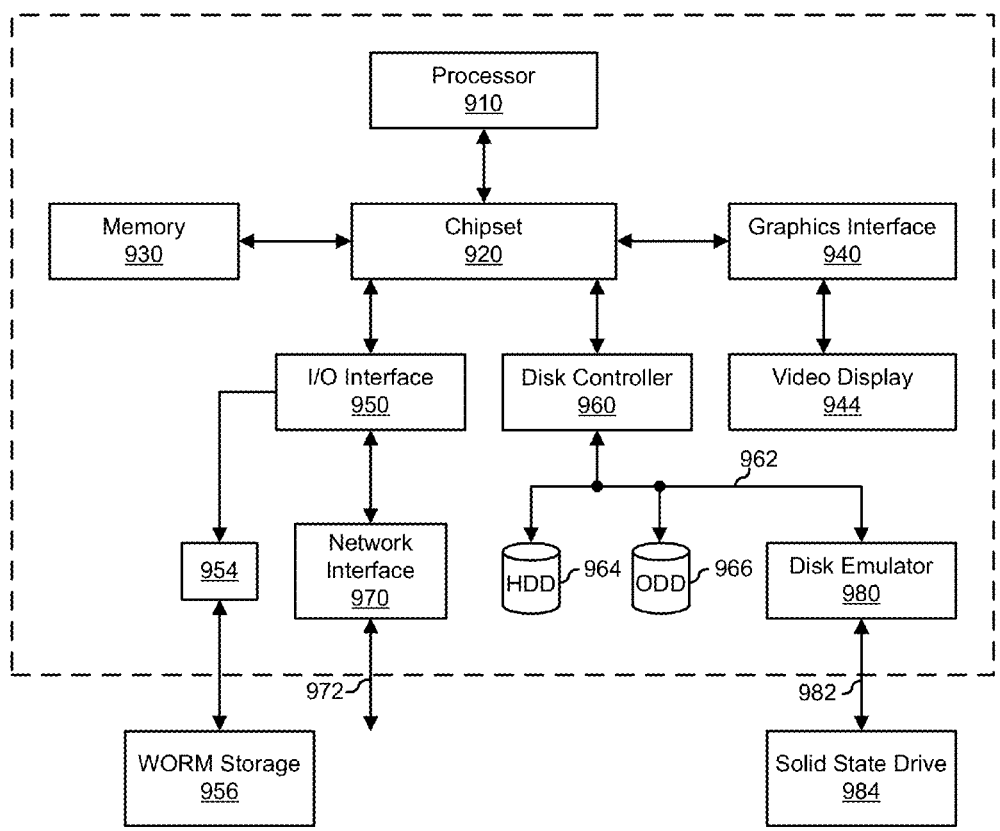
FIG. 9 is a functional block diagram illustrating an exemplary embodiment of an information handling system.

In a particular embodiment, an information handling system can be used to carry out one or more of the methods described above. In another embodiment, one or more of the systems described above can be implemented in the form of an information handling system. FIG. 9 illustrates a functional block diagram of an embodiment of an information handling system, generally designated as 900. Information handling system 900 includes processor 910, a chipset 920, a memory 930, a graphics interface 940, an input/output (I/O) interface 950, a disk controller 960, a network interface 970, and a disk emulator 980.

Processor 910 is coupled to chipset 920. Chipset 920 supports processor 910, allowing processor 910 to process machine-executable code. In a particular embodiment (not illustrated), information handling system 900 includes one or more additional processors, and chipset 920 supports the multiple processors, allowing for simultaneous processing by each of the processors, permitting the exchange of information between the processors and the other elements of information handling system 900. Processor 910 can be coupled to chipset 920 via a unique channel, or via a bus that shares information between processor 910, chipset 920, and other elements of information handling system 900.

Memory 930 is coupled to chipset 920. Memory 930 can be coupled to chipset 920 via a unique channel, or via a bus that shares information between chipset 920, memory 930, and other elements of information handling system 900. In particular, a bus can share information between processor 910, chipset 920 and memory 930. In a particular embodiment (not illustrated), processor 910 is coupled to memory 930 through a unique channel. In accordance with another aspect (not illustrated), an information handling system can include a separate memory dedicated to each of the processors. A non-limiting example of memory 930 includes static, dynamic. Or non-volatile random access memory (SRAM, DRAM, or NVRAM), read only memory (ROM), flash memory, another type of memory, or any combination thereof.

Graphics interface 940 is coupled to chipset 920. Graphics interface 940 can be coupled to chipset 920 via a unique channel, or via a bus that shares information between chipset 920, graphics interface 940, and other elements of information handling system 900. Graphics interface 940 is coupled to a video display 944. Other graphics interfaces (not illustrated) can also be used in addition to graphics interface 940 if needed or desired. Video display 944 can include one or more types of video displays, such as a flat panel display or other type of display device.

I/O interface 950 is coupled to chipset 920. I/O interface 950 can be coupled to chipset 920 via a unique channel, or via a bus that shares information between chipset 920, I/O interface 950, and other elements of information handling system 900. Other I/O interfaces (not illustrated) can also be used in addition to I/O interface 950 if needed or desired. I/O interface 950 is coupled to one or more add-on resources 954. Add-on resource 954 is connected to a WORM storage system 956, similar to WORM storage systems 120 or 520, and can also include another data storage system, a graphics interface, a network interface card (NIC), a sound/video processing card, another suitable add-on resource or any combination thereof.

Network interface device 970 is coupled to I/O interface 950. Network interface 970 can be coupled to I/O interface 950 via a unique channel, or via a bus that shares information between I/O interface 950, network interface 970, and other elements of information handling system 900. Other network interfaces (not illustrated) can also be used in addition to network interface 970 if needed or desired. Network interface 970 can be a network interface card (NIC) disposed within information handling system 900, on a main circuit board (e.g., a baseboard, a motherboard, or any combination thereof), integrated onto another component such as chipset 920, in another suitable location, or any combination thereof. Network interface 970 includes a network channel 972 that provide interfaces between information handling system 900 and other devices (not illustrated) that are external to information handling system 900. Network interface 970 can also include additional network channels (not illustrated).

Disk controller 960 is coupled to chipset 910. Disk controller 960 can be coupled to chipset 920 via a unique channel, or via a bus that shares information between chipset 920, disk controller 960, and other elements of information handling system 900. Other disk controllers (not illustrated) can also be used in addition to disk controller 960 if needed or desired. Disk controller 960 can include a disk interface 962. Disk controller 960 can be coupled to one or more disk drives via disk interface 962. Such disk drives include a hard disk drive (HDD) 964 or an optical disk drive (ODD) 966 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 960 can be coupled to disk emulator 980. Disk emulator 980 can permit a solid-state drive 984 to be coupled to information handling system 900 via an external interface. The external interface can include industry standard busses (e.g., USB or IEEE 1384 (Firewire)) or proprietary busses, or any combination thereof. Alternatively, solid-state drive 984 can be disposed within information handling system 900.

In the embodiments described above, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A Write-Once Read-Many (WORM) memory controller operably coupleable to a memory storage device and to a host processing system, and operable to:
   initialize WORM functionality in the memory storage device;
   receive first data from the host processing system, the first data being addressed to a sector in the memory storage device;
   in response to receiving the first data, issue a first verification command to the memory storage device, wherein the first verification command includes a first tag value which indicates that a specified sector has not been written to since being initialized;
   receive a first verification reply from the memory storage device, wherein the first verification reply includes an indication that the first tag value matches a tag field of the sector;
   store the first data in the sector and a second tag value different from the first tag value in the tag field of the sector in response to receiving the first verification reply;
   receive second data from the host processing system, the second data being addressed to the sector;
   in response to receiving the second data, issue a second verification command to the memory storage device, wherein the second verification command includes the first tag value;
   receive a second verification reply from the memory storage device, wherein the second verification reply includes an indication that the tag field of the sector includes the second tag value; and
   prevent the second data from being stored in the sector based upon the presence of the second tag value in the tag field.

2. The WORM memory controller of claim 1, further operable to send an error message to the host processing system in response to preventing the second data from being stored in the sector.

3. The WORM memory controller of claim 1, wherein the WORM memory controller is a Small Computer System Interface (SCSI) memory controller.

4. The WORM memory controller of claim 3, wherein the sector includes a data integrity field with an application tag field.

5. The WORM memory controller of claim 4, wherein the first tag value is stored in the application tag field.

6. The WORM memory controller of claim 5, wherein, prior to receiving the first data, the WORM memory controller is operable to store the second tag value in the sector.

7. The WORM memory controller of claim 1, wherein the WORM memory controller comprises an encryption key, and wherein the storage device encrypts the first data before storing the first data in the sector, based upon the encryption key.

8. A method for Write-Once Read-Many (WORM) memory storage, comprising:
   initializing WORM functionality in a memory storage device;
   receiving first data from the host processing system, the first data being addressed to a sector in the memory storage device;
   in response to receiving the first data, issuing a first verification command to the memory storage device, wherein the first verification command includes a first tag value which indicates that a specified sector has not been written to since being initialized;
   receiving a first verification reply from the memory storage device, wherein the first verification reply includes an indication that the first tag value matches a tag field of the sector;
   storing the first data in the sector;
   storing a second tag value different from the first tag value in a tag field of the sector in response to receiving the first verification reply;
   receiving second data from the host processing system, the second data being addressed to the sector;
   in response to receiving the second data, issuing a second verification command to the memory storage device, wherein the second verification command includes the first tag value;
   receiving a second verification reply from the memory storage device, wherein the second verification reply includes an indication that the tag field of the sector includes the second tag value; and
   preventing the second data from being stored in the sector based upon the presence of the second tag value in the tag field.

9. The method for WORM memory storage of claim 8, further comprising sending an error message to the host processing system in response to preventing the second data from being stored in the sector.

10. The method for WORM memory storage of claim 8, wherein the memory storage device is a Small Computer System Interface (SCSI) memory device.

11. The method for WORM memory storage of claim 10, wherein the sector includes a data integrity field with an application tag field.

12. The method for WORM memory storage of claim 11, wherein the first tag is stored in the application tag field.

13. The method for WORM memory storage of claim 12, wherein, prior to receiving the first data, the method further comprises storing the second tag value in the sector.

14. A non-transitory computer-readable medium including code for performing a method, the method comprising:
   initializing, by a Write-Once Read-Many (WORM) memory controller operably coupleable to a memory storage device and to a host processing system, WORM functionality in the memory storage device;
   receiving, by the memory controller, first data from the host processing system, the first data being addressed to a sector in the memory storage device;
   in response to receiving the first data, issuing, by the memory controller, a first verification command to the memory storage device, wherein the first verification command includes a first tag value which indicates that a specified sector has not been written to since being initialized;
   receiving, by the memory controller, a first verification reply from the memory storage device, wherein the first verification reply includes an indication that the first tag value matches a tag field of the sector;

storing, by the memory controller, the first data in the sector and a second tag value different from the first tag value in the tag field of the sector in response to receiving the first verification reply;

receiving, by the memory controller, second data from the host processing system, the second data being addressed to the sector;

in response to receiving the second data, issuing, by the memory controller, a second verification command to the memory storage device, wherein the second verification command includes the first tag value;

receiving, by the memory controller, a second verification reply from the memory storage device, wherein the second verification reply includes an indication that the tag field of the sector includes the second tag value; and preventing, by the memory controller, the second data from being stored in the sector based upon the presence of the second tag value in the tag field.

15. The non-transitory computer-readable medium of claim 14, the method further comprising:

sending, by the memory controller, an error message to the host processing system in response to preventing the second data from being stored in the sector.

16. The non-transitory computer-readable medium of claim 14, wherein the WORM memory controller is a Small Computer System Interface (SCSI) memory controller.

17. The non-transitory computer-readable medium of claim 16, wherein the sector includes a data integrity field with an application tag field.

18. The non-transitory computer-readable medium of claim 17, wherein the first tag value is stored in the application tag field.

19. The non-transitory computer-readable medium of claim 18, wherein, prior to receiving the first data, the method further comprises:

storing, by the memory controller, the second tag value in the sector.

20. The non-transitory computer-readable medium of claim 14, wherein the WORM memory controller comprises an encryption key, and wherein the storage device encrypts the first data before storing the first data in the sector, based upon the encryption key.

* * * * *